Figure 1:
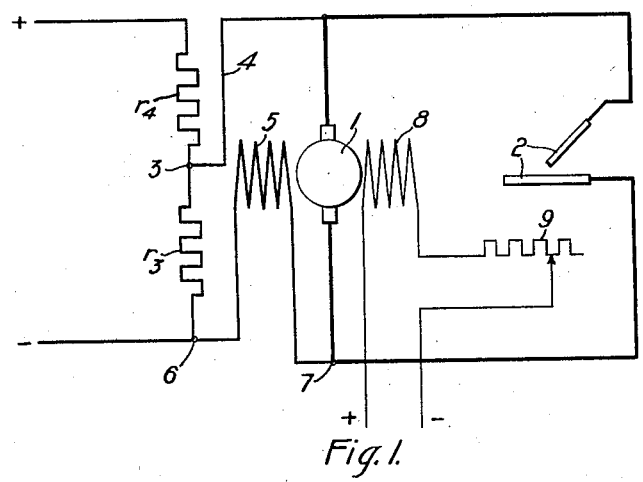

K. L. HANSEN.
ELECTRIC ARC WELDING SYSTEM.
APPLICATION FILED SEPT. 3, 1919.

1,387,487.

Patented Aug. 16, 1921.

WITNESSES:
H. J. Shelhamer
O. E. Bee.

INVENTOR
Klaus L. Hansen
BY
Wesley G. Carr
ATTORNEY

UNITED STATES PATENT OFFICE.

KLAUS L. HANSEN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-ARC-WELDING SYSTEM.

1,387,487.     Specification of Letters Patent.     Patented Aug. 16, 1921.

Application filed September 3, 1919. Serial No. 321,437.

*To all whom it may concern:*

Be it known that I, KLAUS L. HANSEN, a citizen of the United States, and a resident of Wilkinsburg, in the county of Allegheny and State of Pennsylvania, have invented a new and useful Improvement in Electric-Arc-Welding Systems, of which the following is a specification.

My invention relates to electric-arc welding systems, and, more particularly, to generators of the constant-current type which may be employed in direct-current welding systems. The primary object of my invention is to provide direct-current welding systems in which ease of operation shall be combined with deposit-penetrating qualities to insure strong and homogeneous welds.

Heretofore, in direct-current welding systems, it has been customary to consider ease of operation a paramount object, even though detrimental effects should be experienced in the deposit-penetrating power of the welding system. For example, welding systems have been built which could be operated by an inexperienced welder but which did not insure strong welds. In some cases, a large reactance was employed in the welding circuit to obtain great ease in drawing and maintaining an arc. However, the ease with which an arc may be established and sustained frequently has the effect of causing the deposited metal to be merely laid upon the work instead of causing it to penetrate the parent metal, thereby producing a weld of little mechanical strength. The desire, therefore, to produce a welding system which could be operated by an inexperienced operator, defeated the primary object which it was desired to attain because an experienced welder would be required to produce a strong weld.

One object of my invention resides, therefore, in the provision of a welding system in which ease of operation shall be combined with good penetrating qualities so that a relatively inexperienced welder may establish and maintain an arc and also produce a strong and homogeneous weld.

A still further object of my invention is to provide a welding system in which the employment of a relatively bulky and heavy reactance may be obviated and, at the same time, to establish conditions under which a relatively inexperienced operator may produce good welds.

With these and other objects in view, my invention will be more fully described, illustrated in the drawings, in the several views of which corresponding numerals indicate like parts, and then particularly pointed out in the claims.

Figure 2:
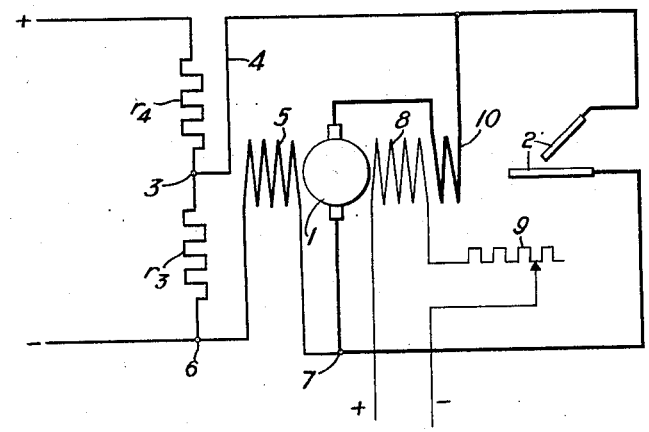
Figures 3, 4:
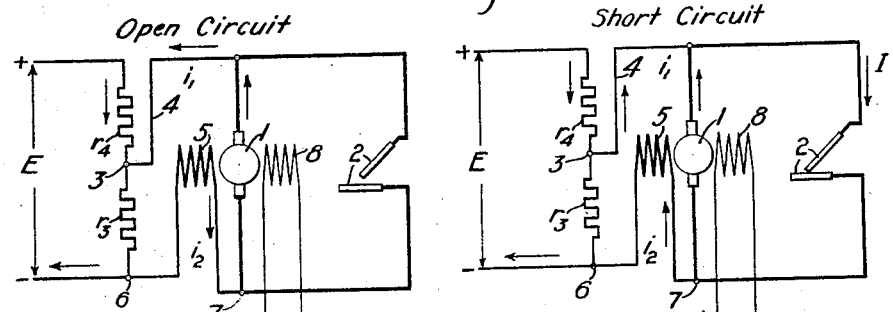

In the drawings, Figure 1 is a diagrammatic view of a welding system which embodies my invention; Fig. 2 is a similar view of a modified form of a welding system provided by my invention, and Figs. 3 and 4 are diagrammatic views, similar to Fig. 1, which illustrate conditions pertaining to welding systems under certain circumstances.

In practising my invention, I may provide a welding system by employing a direct-current generator having a field winding which may be excited from an independent source of electric current and another field winding which may be so excited as to be cumulative with respect to the independently excited field winding at certain times and differential with respect thereto at other times. The generator functions, at all times, to establish a constant current in the welding system. I may employ a plurality of resistors of such proportions and so connected in the welding system as to insure a direction of flow of current in the second winding to establish a field therein, as above mentioned.

Although a welding system constructed in accordance with my invention may be employed with a reactance in the external or welding circuit, I have designed it to possess such characteristics that a reactance need not be employed to obtain ease of operation.

In Fig. 1 is shown a welding system comprising a generator 1 which may be connected to a plurality of electrodes 2. I may employ a plurality of resistors $r_3$ and $r_4$ which are connected in series and which may be connected to an independent source of electric current (not shown). The armature of the generator 1 may be connected between the resistors $r_3$ and $r_4$, as indicated at 3, by a lead 4. A field winding 5 may be connected to the resistor $r_3$, as indicated at 6, and to one terminal of the generator 1, as indicated at 7. Another field winding 8 may be connected, through a variable resistance 9, to the independent source of electric current.

In order to clearly illustrate the conditions which obtain in my welding system, I have shown diagrammatically, in Fig. 3, the direction of currents which obtain under open-circuit conditions, that is, when the welding electrodes 2 are separated and no arc is established between them. Considering the part of the circuit including the generator 1 and the electrodes 2 as the welding circuit, let I be the current in this part of the system; let $i_1$ designate the current which flows in the branch of the system comprising the lead 4, and let $i_2$ be the current which flows through the field winding 5. If the resistance of the winding 5 is considered as $r_2$, and R the resistance of the welding circuit, then $$i_2 = \frac{RI(r_3+r_4) - Er_3}{r_2r_3 + r_2r_4 + r_3r_4},$$

where E is the voltage across the independent source of electric current. It will be apparent from an examination of the above equation that the only variable quantity is the numerator, of which R is subject to changes in value according to the conditions existing in the welding circuit. For example, on open circuit, R is of infinite value, and the voltage between the electrodes is, therefore, the voltage of the generator 1. Under these conditions, the direction of currents which obtain in the system are as indicated by the arrows in the diagram. The current $i_2$ in the winding 5, which is always equal to the current $i_1$ in the lead 4, is in such direction under open-circuit conditions, as to establish a field which is cumulative with respect to the field produced by the winding 8. Obviously, therefore, if the current is reversed, at any time, in the winding 5, the field produced thereby will be differential with respect to the field produced by the winding 8 in which the current always flows in the same direction.

As shown in Fig. 4, the direction of currents is opposite under short-circuit conditions, or, when the electrodes are disposed in engagement preliminary to establishing an arc, to the direction of the currents shown for open-circuit conditions. This may be readily understood by reference to the equation for the value of the current $i_2$ because it is apparent that, when the electrodes are disposed in engagement, the resistance R has a very small value, and the resistors $r_3$ and $r_4$ are so proportioned that, under the short-circuit conditions, the numerator has a negative value, thus indicating a reversal of current in the system. Furthermore, the resistor $r_4$ is so proportioned that the generator 1 cannot, at any time, function as a motor.

The conditions above described have been selected because they represent the two extreme conditions which exist in the welding system. The point at which a reversal of current is obtained in the field winding 5 may be regulated by the proper proportioning of the resistors $r_3$ and $r_4$ to occur at substantially the time when the operator has drawn a welding arc of medium length. It will be appreciated, of course, that the length of the welding arc governs the extent of the voltage drop in the welding circuit. In operating the above described system, the directions of current shown in Fig. 3 exist on open circuit, and when the electrodes are engaged to establish an arc, the directions of currents are as shown in Fig. 4. When an arc has been drawn, the current through the field winding 5 may again reverse in direction if an arc of sufficient length is established between the electrodes. However, the directions of the current in the welding system at all times tend to produce stable conditions in the welding system and permit of ease of operation of the welding arc.

I have shown, in Fig. 2, a modification of my invention which may be employed, if found desirable. The system, here shown, is similar to the system shown in Fig. 1, with the exception that a series field winding 10 is connected between the armature of the generator 1 and one of the electrodes 2. The employment of the series winding 10 is merely a precautionary measure to insure a limiting of the short-circuit current which flows in the welding circuit when the electrodes are disposed in engagement preliminary to establishing an arc. The operation of a system employing the additional series winding is exactly similar to the operation of the system shown in Fig. 1 and does not require further explanation for an understanding of the modified form of my invention.

I have provided, by my invention, a welding system which is very compact and light in weight and which combines the advantageous features of ease of operation with the essential feature of good deposit-penetrating powers. By obviating the necessity of employing a reactance in the external or welding circuit, I have reduced the total weight of the equipment, together with the expense thereof.

Although I have shown and specifically described a plurality of welding systems which embody my invention, I do not wish to be restricted to the particular arrangement of the parts embodied therein, but desire to cover all such combinations as fall within the scope of the appended claims.

I claim as my invention:

1. In an exciting system for generators, the combination with two exciting field windings, of means for exciting one of the windings in the same direction at all times, and means for exciting the remaining winding in one direction at certain times, and in the opposite direction at other times.

2. In an exciting system for a generator subject to a widely variable load, the combination with two exciting field windings, of means for exciting one of the windings in the same direction at all times, and means for exciting the remaining winding cumulatively therewith under light load and differentially with respect thereto under heavy load.

3. In an exciting system for generators, the combination with two exciting field windings, of means for exciting one of the windings in the same direction at all times, and means for exciting the remaining winding in one direction at certain times and in the opposite direction at other times, said means including a plurality of resistors connected to the winding and to one terminal of the generator.

4. In an exciting system for generators, the combination with two exciting field windings, of an independent source of electric current connected to always excite one of the windings in the same direction and means for exciting the remaining winding in one direction at certain times and in the opposite direction at other times, said means including the independent source of current and a plurality of resistors.

5. In an exciting system for generators, the combination with two exciting field windings, of an independent source of electric current connected to always excite one of the windings in the same direction and a plurality of resistors connected in series and so connected to the independent source of current, to the generator and to the remaining winding as to cause the winding to be excited cumulatively with respect to the first winding at certain times and differentially with respect thereto at other times.

6. An arc welding system comprising a plurality of electrodes, a generator connected thereto, an independent source of electric current and means for establishing a field in the generator which is the algebraic sum of a field which is proportional to the current of the generator, an opposing field excited by the independent source of current and a field which is cumulative with respect to the last mentioned field on open-circuit conditions and is differential with respect thereto when the resistance of the welding circuit is below a certain value.

7. An arc welding system comprising a plurality of electrodes, a generator connected thereto, an indepedent source of electric current and means for establishing a field in the generator which is the algebraic sum of a field excited by the independent source of current and a field which is cumulative with respect to the first mentioned field under open-circuit conditions and is differential with respect thereto when the resistance of the welding circuit is below a certain value.

8. An arc welding system comprising a plurality of electrodes, a generator connected thereto, an independent source of electric current, a field winding for the generator connected to the independent source of current, another field winding connected to the source of current and to the generator and a plurality of resistors so connected in the system as to cause the current in the second field winding to reverse in direction of flow when the voltage drop across the electrodes reaches a certain value.

9. An arc welding system comprising a plurality of electrodes, a generator connected thereto, an independent source of current, a plurality of resistors connected in series and connected to the source of current and to one terminal of the generator, a field winding for the generator connected to the independent source of current and another field winding connected to the resistors and to the generator, whereby a current which is caused to flow through the last mentioned winding in one direction when the electrodes are on open circuit is caused to reverse and flow in the opposite direction when the voltage drop between the electrodes reaches a value established by a welding arc of medium length.

In testimony whereof, I have hereunto subscribed my name this 26th day of Aug., 1919.

KLAUS L. HANSEN.